United States Patent
Khsib

(10) Patent No.: US 10,356,404 B1
(45) Date of Patent: Jul. 16, 2019

(54) IMAGE PROCESSING USING JUST-NOTICEABLE-DIFFERENCE THRESHOLDS

(71) Applicant: Amazon Technologies, Inc., Seattle, WA (US)

(72) Inventor: Ramzi Khsib, Coquitlam (CA)

(73) Assignee: Amazon Technologies, Inc., Seattle, WA (US)

( * ) Notice: Subject to any disclaimer, the term of this patent is extended or adjusted under 35 U.S.C. 154(b) by 78 days.

(21) Appl. No.: 15/719,253

(22) Filed: Sep. 28, 2017

(51) Int. Cl.
  *H04N 19/122* (2014.01)
  *H04N 19/162* (2014.01)
  *H04N 19/14* (2014.01)
  *H04N 19/176* (2014.01)

(52) U.S. Cl.
  CPC ........... *H04N 19/122* (2014.11); *H04N 19/14* (2014.11); *H04N 19/162* (2014.11); *H04N 19/176* (2014.11)

(58) Field of Classification Search
  CPC .. H04N 19/122; H04N 19/176; H04N 19/162; H04N 19/14
  See application file for complete search history.

(56) References Cited

U.S. PATENT DOCUMENTS

| | | | |
|---|---|---|---|
| 6,792,129 B1* | 9/2004 | Zeng | G06T 1/0028 382/100 |
| 9,036,712 B1* | 5/2015 | Cote | H04N 19/139 375/240.24 |
| 2005/0002458 A1* | 1/2005 | Bruls | H04N 19/172 375/240.21 |
| 2007/0274387 A1* | 11/2007 | Kurahashi | G06K 9/3266 375/240.13 |
| 2009/0202163 A1* | 8/2009 | Romm | H04N 19/139 382/236 |
| 2011/0243228 A1* | 10/2011 | Ngan | H04N 19/159 375/240.13 |
| 2014/0169451 A1* | 6/2014 | Cohen | H04N 19/176 375/240.03 |
| 2015/0029210 A1* | 1/2015 | Daly | G09G 5/02 345/591 |
| 2015/0371605 A1* | 12/2015 | Wu | G09G 5/02 345/604 |

* cited by examiner

*Primary Examiner* — Ming Y Hon
(74) *Attorney, Agent, or Firm* — Knobbe, Martens, Olson & Bear, LLP

(57) ABSTRACT

Systems and methods are described to process image-based content to reduce the complexity of information used to represent the content, without visible different to a viewing user. Individual images of the content items can be broken into image blocks, each of which can be converted via DCT algorithm to a DCT matrix. Values within the DCT matrix can be compared to just-noticeable-difference (JND) thresholds, below which information is unlikely to be perceptible to viewing users. For each value in the DCT matrix below a corresponding JND threshold, the value can be reduced to zero, thus reducing complexity of the image without perceptible difference to a viewing user and enabling more efficient use of computing resources to store and transmit the image. JND thresholds can be based on one or more models of human perception, including a contrast sensitivity function model, a luminance adjustment model, and a contrast masking model.

20 Claims, 5 Drawing Sheets

IMAGE PROCESSING USING JUST-NOTICEABLE-DIFFERENCE THRESHOLDS

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

Service providers or content creators (such as businesses, artists, media distribution services, etc.) can employ a series of interconnected data centers to deliver content (such as web sites, web content, or other digital data) to users or clients. These interconnected data centers are sometimes referred to as "content delivery networks" (CDNs) or content delivery systems. Existing routing and addressing technologies can enable multiple data centers associated with a content delivery system to provide similar or identical content to client computing devices. In some instances, each data center providing a set of content may be referred to as a point-of-presence ("POP"). A content delivery system can maintain POPs over a wide area (or worldwide) to enable the system to efficiently service requests from clients in a variety of locations.

CDNs can be utilized to distribute wide varieties of content. In some instances, CDNs may distribute relatively small files, such as hypertext markup language (HTML) documents, which are downloaded in their entirety to a client device before being processed. In other instances, CDNs may distribute larger files, such as high-resolution images or videos. Generally, these images or videos are generated at a higher quality (e.g., higher resolution, bitrate, etc.) than is feasible to transport over networks, or would be displayable on a client computing device. Moreover, these images or videos often contain information that would not be noticeable to an end user under typical viewing conditions. Thus, it may be desirable to remove unnecessary or unnoticeable information from an image or video in order to reduce the size of a file containing the image or video and to facilitate transmission of the file, processing of the file, and the like.

DETAILED DESCRIPTION

Figure 1:
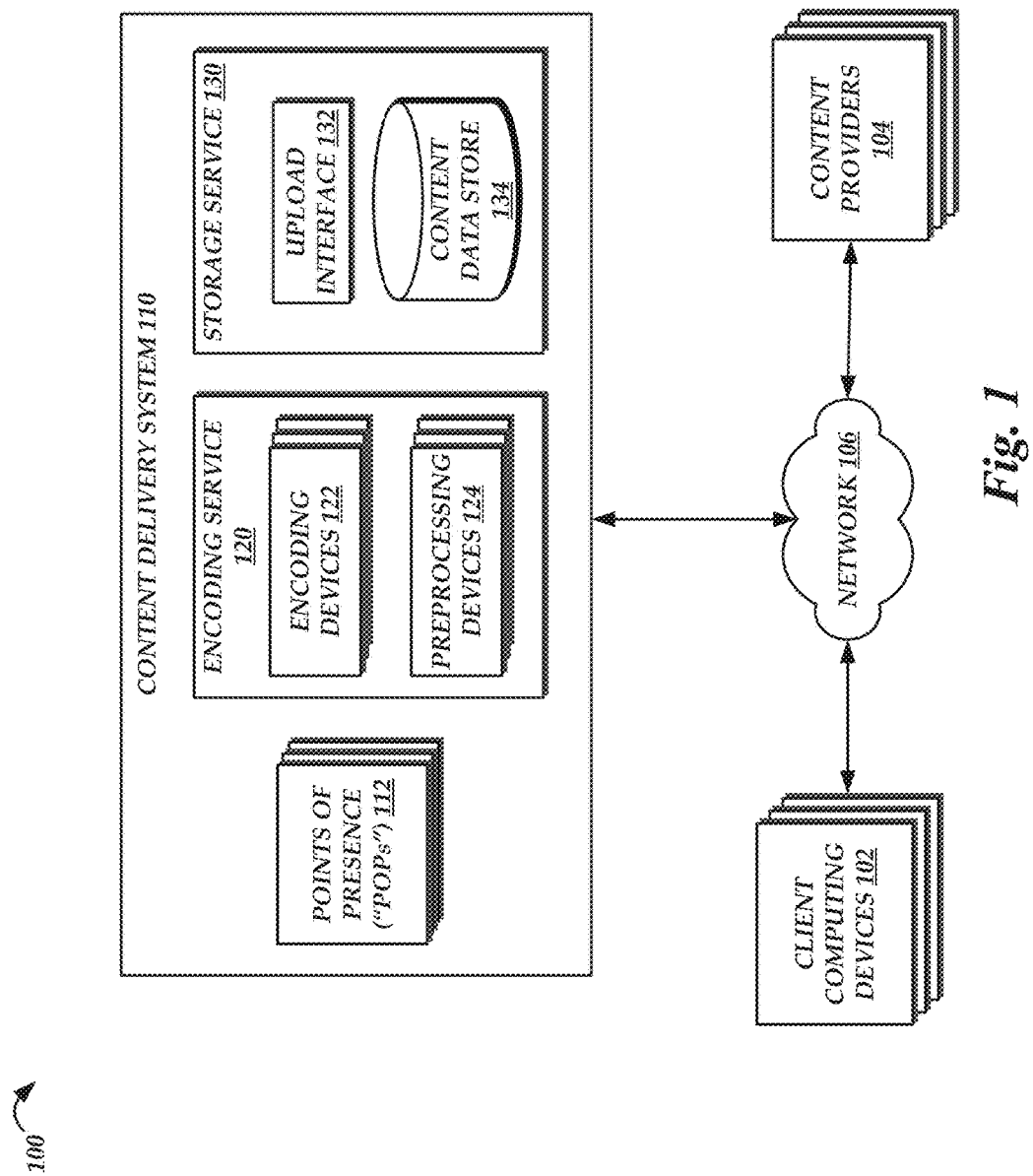
FIG. 1 is a block diagram depicting an illustrative logical network environment including client computing devices, content providers, and a content delivery system configured to provide encoded content items to the client computing devices over a computing network, and to preprocess input content items prior to encoding to reduce or eliminate unnecessary information within the input content items.

Generally described, the present disclosure relates to processing content items, such as video or images, in order to reduce or eliminate information within the content items that would not be noticeable to a viewing user. More specifically, the present disclosure enables preprocessing of content items prior to encoding of the content items to reduce or eliminate unnoticeable or unnecessary information, thus reducing the memory required to store the content item, particularly in encoded form without impacting the perceivable quality of an encoded content item relative to an item that did not undergo preprocessing. As will be discussed below, preprocessing can include manipulating individual blocks of an image, each block representing a matrix of pixels of the image according to a component of a color space, such as the luma (Y') component of the Y'CbCr color space. Each block may be transformed into a frequency domain via a discrete cosine transform (DCT). Thereafter, each DCT sub-band value may be compared to a threshold value associated with perceptibility to a viewing user. If the DCT sub-band value falls below the corresponding threshold value, the DCT sub-band may be set to zero, reducing the noise and complexity of the image. The block may then be transformed back to its original color space by inverting the DCT, thus resulting in a preprocessed image with reduced information, but without noticeable difference to a viewing user.

As will be described in detail below, threshold values for DCT sub-bands may be established by a combination of equations addressing different factors that enable a viewing user to perceive information within an image. In one embodiment, threshold values for DCT sub-bands are determined by multiplicative combination of values derived from a contrast sensitivity function (CSF), a contrast masking (CM) model, and luminance adaptation (LA) model. Each model will be described in detail below. However, in brief, the contrast sensitivity function may represent a human's ability to perceive various frequencies of stimuli. It has been shown empirically that a human's ability to perceive frequencies decreases as the frequencies increase. Thus, for example, a repeated pattern of white and black stripes may be perceivable to a human if repeated at a low frequency (e.g., one stripe per millimeter), put may simply appear as a patch of solid grey if repeated at a very high frequency (e.g., one stripe per micrometer or nanometer). This ability or perceive frequencies is referred to as "contrast sensitivity" or "visual acuity." While ability to perceive patterns varies between individuals, empirical studies have shown that generalizations are possible across populations, such that given a frequency, a contrast sensitivity function can predict that the pattern is likely to be viewable by a given percentage of viewers. As will be described below, the theory of contrast sensitivity can be applied to image processing, such that for each DCT sub-band (representing a set of frequencies within an image) within an image block (e.g., an 8×8 group of pixels of the image), a threshold can be established under which a given percentage (e.g., 95%) of viewers would be unable to notice the muting of the sub-band (e.g., setting a value of the sub-band to zero) within the image. Thus, by applying CSF-derived thresholds to each DCT sub-band of a given image block, the amount of unnecessary or unperceivable information (which information may be considered "noise") can be reduced, reducing the memory required to store or transmit the image without perceptible different to a viewing user.

While CSF-derived thresholds attempt to remove only unnecessary or unperceivable information from an image, empirical research has shown that other characteristics of an image can modify the threshold values at which a muting of a DCT sub-band becomes perceivable to a user. For example, humans are relatively good at detecting minor variations within a low-variance image, such as a single red pixel within an otherwise grey image. In contrast, humans are relatively poor at detecting such variations within a high-variance image, such as an image filled with random colors. In practice, this difference in perceptibility can be used to adjust DCT sub-band thresholds based on a localized variance of an image. For example, DCT sub-band thresholds can be reduced within low-variance portions of an image (e.g., solid portions or slow gradients), while the thresholds can be increased within high-variance portions of the image (e.g., edges). This adjustment based on localized variance is referred to herein as a "contrast masking" or "CM" model. Advantageously, the localized variance of a given image block can be determined based on a DCT representation of the block, thus minimizing processing that is required to adjust DCT sub-band thresholds according to the CM model.

In addition to varying perceptibility based on localized variance, perceptibility can also vary based on a brightness of an image block relative to the image overall. Specifically, it has been determined empirically that humans are more able to perceive modifications to very bright or very dark portions of an image, and less able to perceive modifications to average brightness portions of an image. Thus, the DCT sub-band thresholds can further be adjusted for a given image block based on the relative brightness of the block to the image overall, according to the equations discussed below. This adjustment based on relative brightness is generally referred to herein as a "luminance adjustment" or "LA" model.

By combining CSF thresholds with adjustments based on both the CM and LA models, a set of DCT sub-band thresholds can be computed such that values in the DCT representation of a given image block below a corresponding DCT sub-band threshold are unlikely to be recognized by a viewing user. Thus, these values can be muted (set to zero), reducing the memory required to store the image. Thereafter, the image block can be returned from a frequency representation via an inverse DCT, to result in a reduced-complexity image block. The respective image blocks can then be recombined to result in a reduced-complexity image without perceivable different to an end user.

In some embodiments, reduced complexity image blocks may be produced for a set of distinct, non-overlapping blocks of an image, such as each distinct, non-overlapping block of 8 by 8 pixels. In other embodiments, reduced complexity image blocks may be produced for overlapping blocks of an image. For example, an image may be broken into 8 by 8 blocks of pixels, each of which overlaps a preceding block by 4 pixels in each dimension (e.g., resulting in each block overlapping with four other blocks, two above and two below the block). The values of each block (e.g., the 8-bit representation of a value for a given component of a color space) may be averaged with corresponding values of overlapping blocks to reproduce a reduced-complexity image. This averaging may, for example, reduce artifacts in a reduced-complexity image that would stem from processing non-overlapping blocks of an image. In some instances, the averaging may be weighted in favor of a non-reduced-complexity value. For example, if two Y' values for a given pixel location are being combined, where a first Y' value was changed due to image preprocessing but another Y' value was not changed, the unchanged Y' value may be weighted more heavily during averaging of the two values, such that the final Y' value for the pixel in the combined image is more similar to the original value prior to processing. This weighting in favor of unchanged values can further reduce the perceivability of modifications to an image during preprocessing.

While some embodiments of the present disclosure are discussed with respect to values of a specific component of a color-space representation of an image (e.g., the luminance, or Y', component of the Y'CbCr color space), other components such a color-space representation may also be processed according to the processes described herein. For example, within a Y'CbCr color space representation of an image, the value of each of the Y', Cb, and Cr components may be processed according to DCT sub-band threshold values to reduce the complexity of the image with respect to that component. In some instances, the thresholds used to reduce complexity of chrominance values (e.g., values of Cb and Cr components) may different from thresholds used to reduce complexity of luminance values. Illustratively, a CSF threshold value may be used alone for processing chrominance values, without adjustments according to the CM and LA models, these adjustments have been empirically determined in some instances to be unnecessary with respect to chrominance values. Further, while embodiments of the present disclosure may be discussed with respect to images, these embodiments may also be applied to other content items, such as videos, multimedia, or other image-based content such as interactive services (e.g., video games, virtual or augmented reality content, or other immersive content). For example, each frame of a video (representing an image) may be processed according to embodiments described herein, to result in a reduced-complexity video. Thus, embodiments of the present disclosure can enable processing of a variety of image-based or image-including content items.

As is described below, aspects of the present disclosure may be implemented by a content delivery system, including a processing device configured to preprocess an input content item prior to encoding of the content item for delivery over a network, an encoding device to encode the content item for delivery over the network, and one or more points-of-presence ("POPs") to transmit the encoded content item to client computing devices for output. Illustratively, a content provider may transmit an input to the content delivery service, which may utilize the processing device and encoding service to generate, from the input, an encoded content item to be delivered to client computing devices that is reduced in size and complexity relative to conventional encoding techniques. While some examples are provided herein with respect to a content delivery system including POPs, embodiments of the present disclosure may be implemented with respect to any network of computing devices that operates to process content items. For example, embodiments of the present disclosure may be implemented by a network-based content encoding service independently of a content distribution network or set of POPs. Thus, the examples provided herein are intended to be illustrative, and not exhaustive, in nature.

As will be appreciated by one of skill in the art in light of the description above, the embodiments disclosed herein substantially increase the ability of computing systems, such as network-connected encoding devices, to generate reduced-complexity content items without noticeably reducing the quality of such content items. Thus, the presently disclosed embodiments represent an improvement in the functioning of such computing systems, by enabling more efficient storage and transmission of encoded content items, by virtue of the reduced size of the content items relative to those that have not been preprocessed according to just-noticeable-difference thresholds. Moreover, the presently disclosed embodiments address technical problems inherent within computing systems; specifically, the limited computing resources available to store and transmit content items. These technical problems are addressed by the various technical solutions described herein, including the use of just-noticeable-difference DCT sub-band thresholds to produce reduced-complexity images or video without noticeably reducing the quality of such content item. Thus, the present disclosure represents a substantial improvement on existing network encoding systems and computing systems in general.

The foregoing aspects and many of the attendant advantages of the present disclosure will become more readily appreciated as the same become better understood by reference to the following, when taken in conjunction with the accompanying drawings.

FIG. 1 is a block diagram depicting an illustrative logical network environment 100 including multiple client computing devices 102 and content providers 104 in communication with a content delivery system 110 via a network 106. While the client computing devices 102 and the content providers 104 are shown as grouped within FIG. 1, the client computing devices 102 and content providers 104 may be geographically distant, and independently owned or operated. For example, the client computing devices 102 could represent a multitude of users in various global, continental, or regional locations accessing the content delivery system 110. Further, the content providers 104 could represent a multitude of related or distinct parties that have associated with the content delivery system 110 to provide content items, such as audio or video content, to the client computing devices 102. While shown as distinct, the client computing devices and content providers 104 may be operated by a common entity, or by a common computing device. Accordingly, the grouping of client computing devices 102 and content providers 104 within FIG. 1 is intended to represent a logical, rather than physical, grouping. Similarly, each of the components of the content delivery system 110 may be located within geographically diverse areas. For example, the content delivery system 110 can contain POPs 112 at a variety of globally, continentally, or regionally distinct locations, in order to provide a wide geographical presence for the content delivery system 110.

Network 106 may be any wired network, wireless network, or combination thereof. In addition, the network 106 may be a personal area network, local area network, wide area network, cable network, satellite network, cellular telephone network, or combination thereof. In the example environment of FIG. 1, network 106 is a global area network (GAN), such as the Internet. Protocols and components for communicating via the other aforementioned types of communication networks are well known to those skilled in the art of computer communications and thus, need not be described in more detail herein. While each of the client computing devices 102, content providers 104, and content delivery system 110 is depicted as having a single connection to the network 106, individual components of the client computing devices 102, content providers 104, and content delivery system 110 may be connected to the network 106 at disparate points. Accordingly, communication times and capabilities may vary between the components of FIG. 1.

Client computing devices 102 may include any number of different computing devices capable of communicating with the content delivery system 110. For example, individual client computing devices 102 may correspond to a laptop or tablet computer, personal computer, wearable computer, server, personal digital assistant (PDA), hybrid PDA/mobile phone, mobile phone, electronic book reader, set-top box, camera, digital media player, and the like. Each client computing device 102 may include hardware and/or software enabling the reception and output of content items, including dedicated playback hardware, dedicated software (e.g., specially programmed applications), and general-purpose software (e.g., web browsers) capable of outputting content items (e.g., by downloading the content items directly, downloading a web page referencing or including the content items, streaming the content items, etc.). The specific configuration of individual client computing devices 102 may vary.

Content providers 104 may include any computing device owned or operated by an entity that provides input content to the content delivery system 110 for subsequent transmission to client computing devices (which may include one or more client computing devices 102) as a content item. For example, content providers 104 may include servers providing audio, video, text, multimedia, or interactive services (e.g., video games, virtual or augmented reality content, or other immersive content). While illustratively shown in FIG. 1 as a network-attached computing device, content providers 104 may additionally or alternatively provide input content to the content delivery system 110 via non-networked communication channels (e.g., via physical delivery of data).

The content delivery system 110 can include a variety of components and devices configured to enable client computing devices 102 to access content items generated by the content delivery system 110 based on input content provided by the content providers 104. Specifically, the content delivery system 110 can include a number of POPs 112 configured to host content, or act as a caching point for content hosted by the content delivery system 110 or the content providers 104. Each POP 112 may include a variety of computing devices configured to serve content to client computing devices 102. Accordingly, though not shown in FIG. 1, each POP 112 may include any number of processors, data stores, or networking components operating in conjunction to facilitate retrieval and delivery of content to client computing devices. The POPs 112 may communicate with other components of the content delivery system 110 via an internal network of that system 110, which may include any wired network, wireless network, or combination thereof, and may be a personal area network, local area network, wide area network, cable network, satellite network, cellular telephone network, or combination thereof. In some instances, the internal network may be implemented at least in part by the network 106 (e.g., as a virtual private network, or "VPN"). Illustratively, each POP 112 may function to hold a limited selection of content items within a local cache data store (e.g., the most recently requested n content items), such that these content items can be quickly transmitted to client computing devices 102. When the local cache data store does not include a requested content items, the POP 112 can be configured to retrieve the content items from a remote data store, such as a content data store 134 of a storage service 130 within the content delivery system 110, and return the content items to a requesting client computing device 102.

The content delivery system 110 can further include a storage service 130 facilitating storage of content items within a content data store 134. The content data store 134 can correspond to any persistent or substantially persistent data storage, such as a hard drive (HDD), a solid-state drive (SDD), network attached storage (NAS), a tape drive, or any combination thereof. The storage service 130 can enable uploading of content to the content data store 134. To facilitate uploading of content, the storage service 130 can include an upload interface 132 through which other devices can request initiation of an upload and transfer (e.g., upload) a content item to the storage service 130. The upload interface 132 may correspond, for example, to an application programming interface (API), graphical user interface (GUI), command line interface (CLI), or the like.

The encoding service 122 may include one or more preprocessing devices 124 configured to generate reduced-complexity content items by preprocessing input content items prior to encoding, as well as one or more encoding devices 122 configured to encode the reduced-complexity content items into encoded content items. As will be discussed below, the preprocessing devices 124 by deconstruct content items into individual images, divide the images into blocks, and conduct preprocessing on the blocks by comparing DCT sub-band values of the blocks to a set of JND threshold values, and zeroing out (or muting) DCT sub-band values that do not meet the JND threshold values. The preprocessing devices 124 may then reconstruct the content items by reconstructing images based on the processed blocks, and returning the images to an original format of the input content item (if necessary) to result in a reduced-complexity content item. Thereafter, the encoding devices 122 may receive the reduced complexity content item and encode the input content into an encoded content item suitable for delivery over the network 106. The encoding service 120 may operate to process input content of a variety of known content formats, and to encode such input content into a streaming-compatible content item of a variety of known content formats. The formats of either or both of the input contents and streaming-compatible contents may include, for example, H.263, H.264, H.265, MICROSOFT SMPTE 421M (also known as VC-1), APPLE™ ProRes, APPLE Intermediate Codec, VP3 through 9, Motion JPEG ("M-JPEG"), MPEG-2 part 2, RealVideo, Dirac, Theora, and MPEG-4 Part 2 (for video), and Vorbis, Opus, MP3, advanced audio coding ("AAC"), pulse-code modulation ("PCM"), dedicated to sound ("DTS"), MPEG-1, audio coding 3 ("AC-3"), free lossless audio codec ("FLAC"), and RealAudio (for audio), or combinations thereof. While described as an encoding service 120 the encoding devices 122 may provide additional functionalities in addition to encoding, such as packaging of encoded content into a container file, which file may represent a streaming-compatible content item. Examples of containers include, but are not limited to, Matroska, FLV, MPEG-4 Part 12, VOB, Ogg, Audio Video Interleave ("AVI"), Quicktime, Advanced Systems Format ("ASF"), RealMedia, ISO Base Media File Format (ISOBMFF), fragmented MP4 (fMP4), and MPEG Transport Stream ("MPEG-TS"). Encoding of input content into encoded base content data, and generation of an index for such base content data, is known in the art and thus not described in detail herein.

As will be appreciated based on the above, utilization of preprocessing devices 124 can reduce the complexity of content items encoded by the encoding devices 122, and thus may both increase the speed of operation of the encoding devices 122 (relative to encoding content items that have not been preprocessed) and result in a reduction in size of the encoded content items (due to an increased efficiency of encoding reduced-complexity content items).

While examples may be provided herein with reference to a single preprocessing device 124, embodiments of the present disclosure may utilize multiple preprocessing devices 124 to generate reduced-complexity content items from an input content. For example, each of a multitude of preprocessing devices 124 may process an input content item with respect to a different component of a color space used to represent the input content item. For multi-image content items (e.g., video) each of a multitude of preprocessing devices 124 may process a different image within the content item. Moreover, each of a multitude of preprocessing devices 124 may process different blocks within an image of a content item. An individual preprocessing device 124 may act as a coordinator for the multiple preprocessing devices 124 to initiate preprocessing of a content item and to generate a reduced-complexity content item on completion of the tasks of the various preprocessing devices 124. In other embodiments, an individual preprocessing device 124 may operate to preprocess content items at least partly in parallel, such as by using multiple processors or multiple processing threads to concurrently preprocess different images, image blocks, or component values of an input content item.

It will be appreciated by those skilled in the art that the content delivery system 110 may have fewer or greater components than are illustrated in FIG. 1. In addition, the content delivery system 110 could include various web services and/or peer-to-peer network configurations. Thus, the depiction of the content delivery system 110 in FIG. 1 should be taken as illustrative. For example, in some embodiments, components of the content delivery system 110, such as the encoding service 120 or the storage service 130, may be executed by one more virtual machines implemented in a hosted computing environment. A hosted computing environment may include one or more rapidly provisioned and released computing resources, which computing resources may include computing, networking and/or storage devices. A hosted computing environment may also be referred to as a cloud computing environment.

Figure 2:
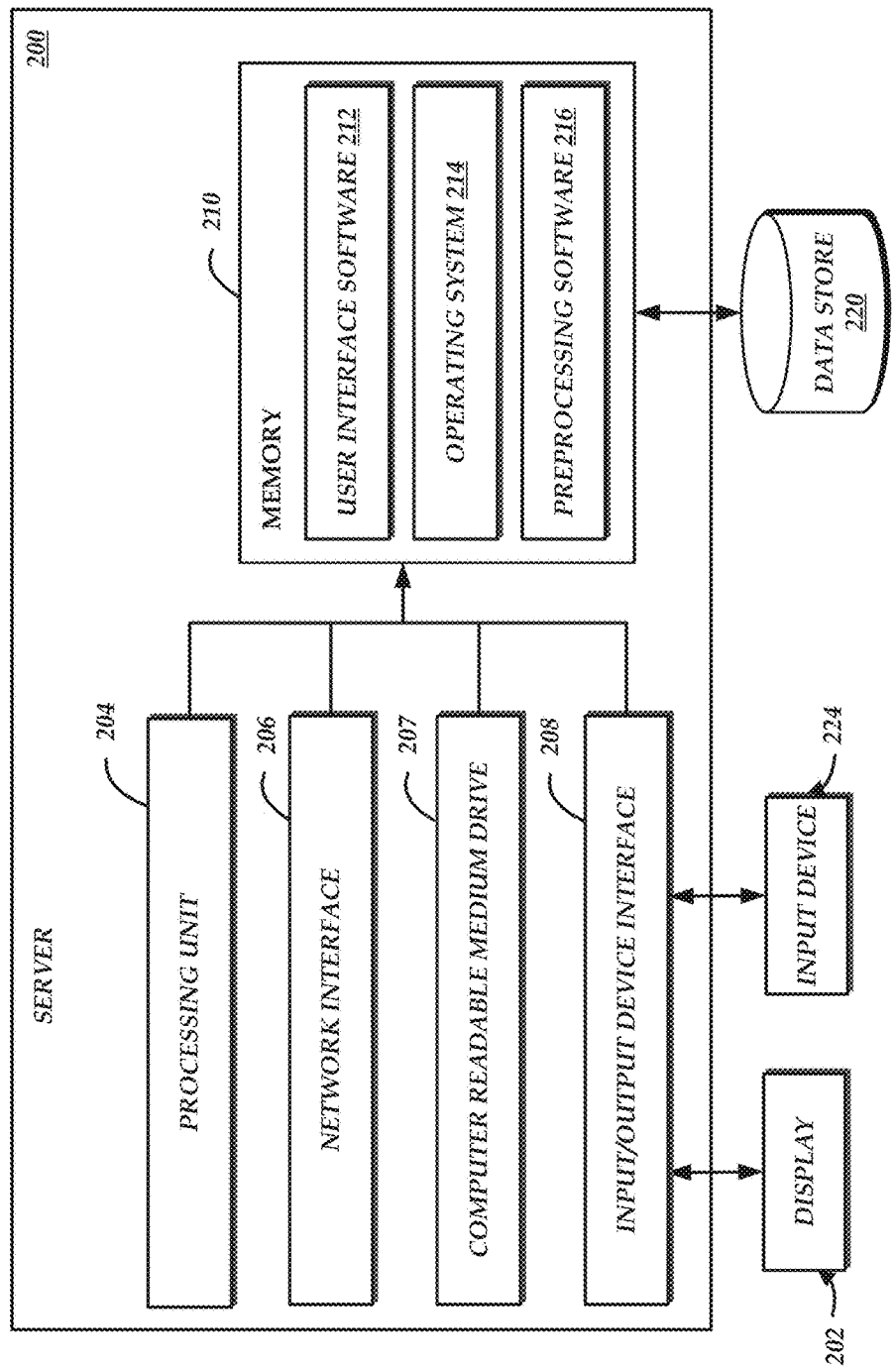
FIG. 2 is a block diagram depicting an illustrative configuration of one embodiment of a server that may implement a preprocessing device within the content delivery system of FIG. 1, which may preprocess input content items in order to reduce or eliminate unnecessary information within the input content items.

FIG. 2 depicts one embodiment of an architecture of a server 200 that may implement an encoding device 122 described herein. The general architecture of server 200 depicted in FIG. 2 includes an arrangement of computer hardware and software components that may be used to implement aspects of the present disclosure. As illustrated, the server 200 includes a processing unit 204, a network interface 206, a computer readable medium drive 207, an input/output device interface 208, a display 202, and an input device 224, all of which may communicate with one another by way of a communication bus. The network interface 206 may provide connectivity to one or more networks or computing systems, such as the network 106 of FIG. 1. The processing unit 204 may thus receive information and instructions from other computing systems or services via a network. The processing unit 204 may also communicate to and from memory 210 and further provide output information for an optional display 202 via the input/output device interface 208. The input/output device interface 220 may also accept input from the optional input device 224, such as a keyboard, mouse, digital pen, etc. In some embodiments, the server 200 may include more (or fewer) components than those shown in FIG. 2. For example, some embodiments of the server 200 may omit the display 202 and input device 224, while providing input/output capabilities through one or more alternative communication channel (e.g., via the network interface 206).

The memory 210 may include computer program instructions that the processing unit 204 executes in order to implement one or more embodiments. The memory 210 generally includes random access memory (RAM), read only memory (ROM) and/or other persistent or non-transitory memory. The memory 210 may store an operating system 214 that provides computer program instructions for use by the processing unit 204 in the general administration and operation of the server 200. The memory 210 may further include computer program instructions and other information for implementing aspects of the present disclosure. For example, in one embodiment, the memory 210 includes user interface software 212 that generates user interfaces (and/or instructions therefor) for display upon a computing device, e.g., via a navigation interface such as a web browser installed on the computing device. In addition, memory 210 may include or communicate with one or more auxiliary data stores, such as data store 220, which may correspond to any persistent or substantially persistent data storage, such as a hard drive (HDD), a solid state drive (SDD), network attached storage (NAS), a tape drive, or any combination thereof.

In addition to the user interface module 212, the memory 210 may include preprocessing software 216 that may be executed by the processing unit 204. In one embodiment, the preprocessing software 216 implements various aspects of the present disclosure. For example, the preprocessing may correspond to code executable to generate a reduced-complexity content item based on applying JND thresholds to DCT sub-band values of blocks of images within an input content. While preprocessing software 216 is shown in FIG. 2 as part of the server 200, in other embodiments, all or a portion of the software may be implemented by alternative computing devices within the content delivery system 110, such as a computing device of the storage service 130.

Figure 3:
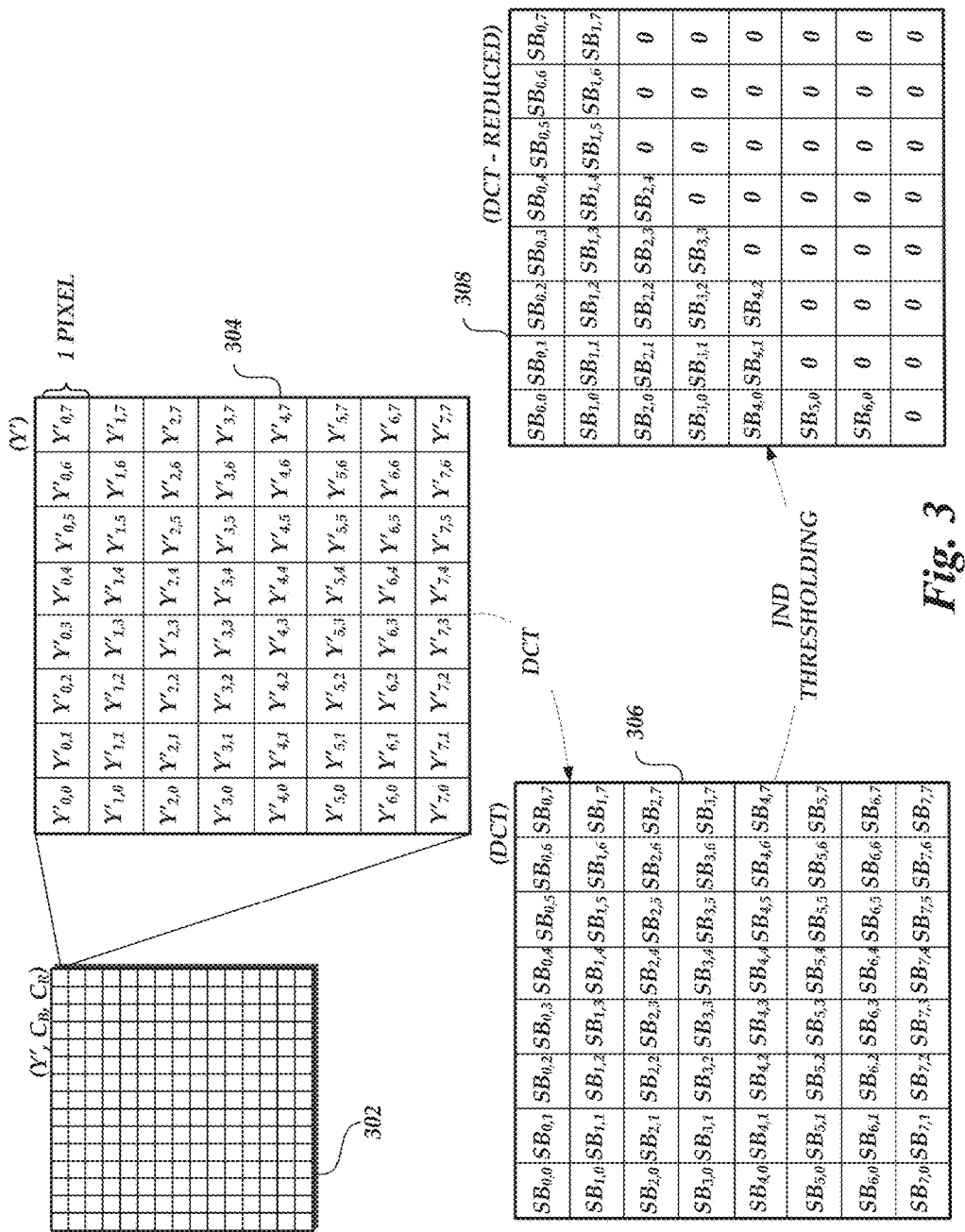
FIG. 3 is an illustrative visualization of an image that may be preprocessed by the content delivery system of FIG. 1, as well as information of the image in various formats, including information prior to and subsequent to preprocessing.

FIG. 3 depicts an illustrative visualization of an image 302 that may be preprocessed by a preprocessing device 124 within the content delivery system 110 of FIG. 1, as well as values of a block of the image in various formats, including values prior to and subsequent to preprocessing. The image 302 of FIG. 3 is blank for the purposes of simplicity, but in practice may represent any image. As shown in FIG. 3, the image 302 is divided into a number of blocks. Illustratively, each block can represent an 8 by 8 matrix of pixels from the image 302. In some instances, the blocks are distinct and non-overlapping. In other instances, the blocks are overlapping by a predetermined number of pixels (e.g., half the size of one dimension of the matrix). Where an image 302 is not evenly divisible by the size of an image block, the preprocessing device 124 may pad the image 302 with additional pixels. These additional pixels may be generated, for example, via edge replication techniques, a number of which are known in the art. In embodiments where overlapping blocks are utilized, padding may be applied to all edges of an image in order to ensure all portions of an image are represented by an equal number of overlapping image blocks.

To facilitate processing, the preprocessing device 124 may evaluate each image block with respect to an individual component of a color space in which the blocks are represented. For example, the preprocessing device 124 may evaluate each image block according to individual Y', Cb, and Cr component values within the Y'CbCr color space. In some instances, the preprocessing device 124 may convert an image from another color space (e.g., RGB) to Y'CbCr to facilitate preprocessing. One visualization of Y' (luminance) values for a given 8 by 8 block of pixels of an image is shown in FIG. 3 as matrix 304. Each element within matrix 304 is associated with a given row, column position (from {0,0} to {7,7}) and represents a luminance value of a pixel at the associated position within the image block. For example, where luminance is represented as an 8-bit value, the value of each element in the matrix 304 may range from 0 to 255.

In conducting processing, the preprocessing device 124 may transform values within the matrix 304 from the spatial into the frequency domain via a DCT algorithm. The DCT algorithm is known in the art, and can be utilized to transform a spatial matrix (such as the values in matrix 304) into a matrix 306 of DCT sub-band values. Each of these sub-band values represents a value of a given frequency within the image block. For example, element {0,0} of the matrix 306 can be used to represent the "direct current" frequency of the image block, which can be set as an average of the values of the matrix 304. The remaining elements can represent values for increasingly higher frequencies within the image block as the matrix 306 is traversed in a downward or rightward direction. Each frequency may represent a rate of change of pixel values within the image 302.

As noted above, human perception has been empirically shown to be limited in its ability to perceive information within an image at different frequencies. Thus, the values of matrix 306 may in some instances represent "noise"—or information within the image block that would not likely be perceptible to human vision. This information can introduce unnecessarily complexity into the image block, increasing the memory and other computing resources necessary to store, process, and transmit the image block. To remove this noise, the matrix 306 can be evaluated according to JND threshold values, which represent a minimum value within the matrix 306 expected to be perceivable to humans. The JND threshold value for each position within the matrix can be calculated as:

$$JND_{Threshold}(x,y) = CSF(x,y,s) * LA_{block} * CM \quad (1)$$

where:
- (x,y) is a {row, column} within an image block;
- $JND_{Threshold}(x,y)$ is the JND threshold value for the {row, column} within the image block;
- CSF(x,y,s) is one of a number of multiple CSF threshold values for a {row,column} within a DCT matrix, the specific CSF threshold value designated by s, where s represents the a desired "strength" of the CSF threshold (e.g., with respect to a reduction of complexity in the image, with respect to a percentage of a population expected to not perceive that reduction in complexity, etc.);
- $LA_{block}$ is a luminance adjustment for the image block; and CM is a contrast model adjustment for the image block.

In one embodiment, CSF threshold values for each row/column combination within a DCT matrix of a given size (e.g., 8×8) are precomputed based on empirical observations of human perception. For example, a number of strengths may be selected to correspond to different expected percentages of a population that would not perceive a change to an image (e.g., 99%, 95%, 85%, 75%, etc.). Thereafter, CSF threshold values for each position within a DCT matrix may be precomputed to correspond to those percentages. Illustratively, CSF threshold values for strength one may be precomputed such that processing an image via those CSF threshold values would result in a reduction in complexity that would not be expected to be perceivable by 99% of a population; CSF threshold values for strength two may be precomputed such that processing an image via those CSF threshold values would result in a reduction in complexity that would not be expected to be perceivable by 95% of a population; etc. One example of a set of precomputed CSF threshold values is provided below, which has been empirically determined to correspond to threshold values for an 8 by 8 pixel block of an 8-bit Y'CbCr image below which 99% of the population would be unable to perceive information within the image block:

TABLE 1

| | | | | | | | |
|---|---|---|---|---|---|---|---|
| 0.8623 | 0.8623 | 0.8148 | 1.0193 | 1.4868 | 2.3318 | 3.8024 | 6.3411 |
| 0.8623 | 0.8351 | 0.8402 | 1.0758 | 1.5668 | 2.4441 | 3.964 | 6.5796 |
| 0.8148 | 0.8402 | 0.9667 | 1.2664 | 1.827 | 2.8053 | 4.4803 | 7.3372 |
| 1.0193 | 1.0758 | 1.2664 | 1.6501 | 2.3318 | 3.494 | 5.4528 | 8.7493 |
| 1.4868 | 1.5668 | 1.827 | 2.3318 | 3.2049 | 4.6633 | 7.0775 | 11.0752 |
| 2.3318 | 2.4441 | 2.8053 | 3.494 | 4.6633 | 6.5796 | 9.6934 | 14.7584 |
| 3.8024 | 3.964 | 4.4803 | 5.4528 | 7.0775 | 9.6934 | 13.866 | 20.5298 |
| 6.3411 | 6.5796 | 7.3372 | 8.7493 | 11.0752 | 14.7584 | 20.5298 | 29.5811 |

As can be seen by the values in TABLE 1, human ability to perceive information generally reduces as frequency increases. Thus, thresholds for lower frequencies within a DCT matrix are lower than thresholds for higher frequencies.

As noted above, an LA model can be utilized to adjust CSF threshold values based on a relative brightness of an image block as compared to an image overall. In one embodiment, the $LA_{block}$ value for a block can be computed as:

$$LA_{block} = \begin{cases} kT * \left(\frac{1-D2}{C00}\right)^{aT} + 2, & RB < 0.5 \\ kQ * \left(\frac{1-D2}{C00}\right)^{aQ} + 1, & RB \geq 0.5 \end{cases} \quad (2)$$

where:

kT is 2;

aT is 3;

D2 is a value representing an expected ability of a human to perceive differences in image content given the relative brightness of an image block as compare to the image as a whole, which may be selected from TABLE 2 below (which may represent empirically derived values indicative of a human's ability to perceive information within image blocks of relative brightness);

TABLE 2

| | AvgLuma$_{block}$ | | | | | | | |
|---|---|---|---|---|---|---|---|---|
| AvgLuma$_{image}$ | 0 | 32 | 64 | 96 | 128 | 160 | 192 | 224 | 256 |
| 0 | 128 | 128 | 128 | 128 | 128 | 128 | 128 | 128 | 128 |
| 32 | 153 | 128 | 128 | 128 | 128 | 128 | 128 | 128 | 114 |
| 64 | 152 | 153 | 128 | 128 | 128 | 128 | 128 | 114 | 98 |
| 96 | 148 | 153 | 128 | 128 | 128 | 128 | 114 | 98 | 85 |
| 128 | 123 | 152 | 153 | 128 | 128 | 114 | 98 | 85 | 36 |
| 160 | 111 | 148 | 153 | 128 | 128 | 128 | 114 | 98 | 85 |
| 192 | 107 | 123 | 152 | 153 | 128 | 128 | 128 | 114 | 98 |
| 224 | 103 | 111 | 148 | 153 | 153 | 128 | 128 | 128 | 114 |
| 256 | 103 | 107 | 123 | 152 | 153 | 128 | 128 | 128 | 128 |

C00 is a mid-point luminance value for a given bitness in which a block is represented (e.g., 128 within an 8-bit representation)

kQ is 1;

aQ is 2; and

RB is the relative brightness of an image block, as computed according to the equation:

$$RB = \frac{AvgLuma_{block}}{AvgLuma_{image}} \quad (3)$$

where:

$AvgLuma_{block}$ is the average luminance value of an image block (e.g., as taken from an average of all Y' values for a block, as represented by the DC value of a DCT matrix for the block generated from Y' values, etc.); and $AvgLuma_{image}$ is the average luminance value of the image as a whole (e.g., as taken from an average of all Y' values for the image, the average DC value of all DCT matrices for the image, etc.).

As also noted above, human ability to perceive changes within a given section of an image change with the variance of information in the image. Thus, the CM model can be used to alter the JND thresholds for an image block based on the variance of the image block. In one embodiment, the $CM_{block}$ value for a block can be computed as:

$$CM_{block} = TexScaleFactor * \frac{SubBandTextureValue - minTexM}{maxTexM - minTexM} + 1 \quad (4)$$

where:

TexScaleFactor, minTexM, and maxTexM are calculated as disclosed in "A perceptual model for JPEG applications based on block classification, texture masking, and luminance masking," by H. H. Y. Tong and A. N. Venetsanopoulos and published in Proceedings 1998

International Conference on Image Processing, ICIP98 (Cat. No. 98CB36269), Chicago, Ill., 1998, pp. 428-432 vol. 3, which is hereby incorporated by reference in its entirety; and SubBandTextureValue is the extent of inter-band masking as calculated according to the teachings of "Improved estimation for just-noticeable visual distortion" by X. H. Zhang, W. S. Lin, and P. Xue and published in Signal Processing, Volume 85 Issue 4, April 2005, Pages 795-808, which is hereby incorporated by reference in its entirety.

Thus, by use of the equations above, a preprocessing device 124 may calculate a set of JND thresholds to be applied to the DCT matrix 306, in order to generate a reduced complexity JND matrix 308. Specifically, the preprocessing device 124 may compare a value of each element within the matrix 306 to a corresponding JND threshold calculated for that element, and if the value of the element within the matrix 306 does not meet the corresponding JND threshold value, set the value of that element to zero within the matrix 308. For example, in the illustrative matrix 308, a number of "high" frequency subbands (e.g., those toward the bottom right of the matrix 308) have been set to zero, representing a reduction in complexity of the matrix 308. This reduction in complexity may enable more compact encoding of the image, as a representation of the image may include a repeated string of "zero" values, which are more simply represented on a computing device. However, because only those subband values that fall below a JND threshold have been set to zero, the reduction in complexity of the matrix 308 is not expected to be perceivable to the majority of viewing users. Thus, by reverting the reduced-complexity DCT matrix 308 into a reduced-complexity Y' matrix, and combining such a reduced-complexity Y' matrix with other such matrices generated from other image blocks within the image 302, the computing resources required to store, transmit, and process the image 302 can be greatly reduced with little or no perceptible loss in quality to the image 302 for most viewing users.

Figure 4:
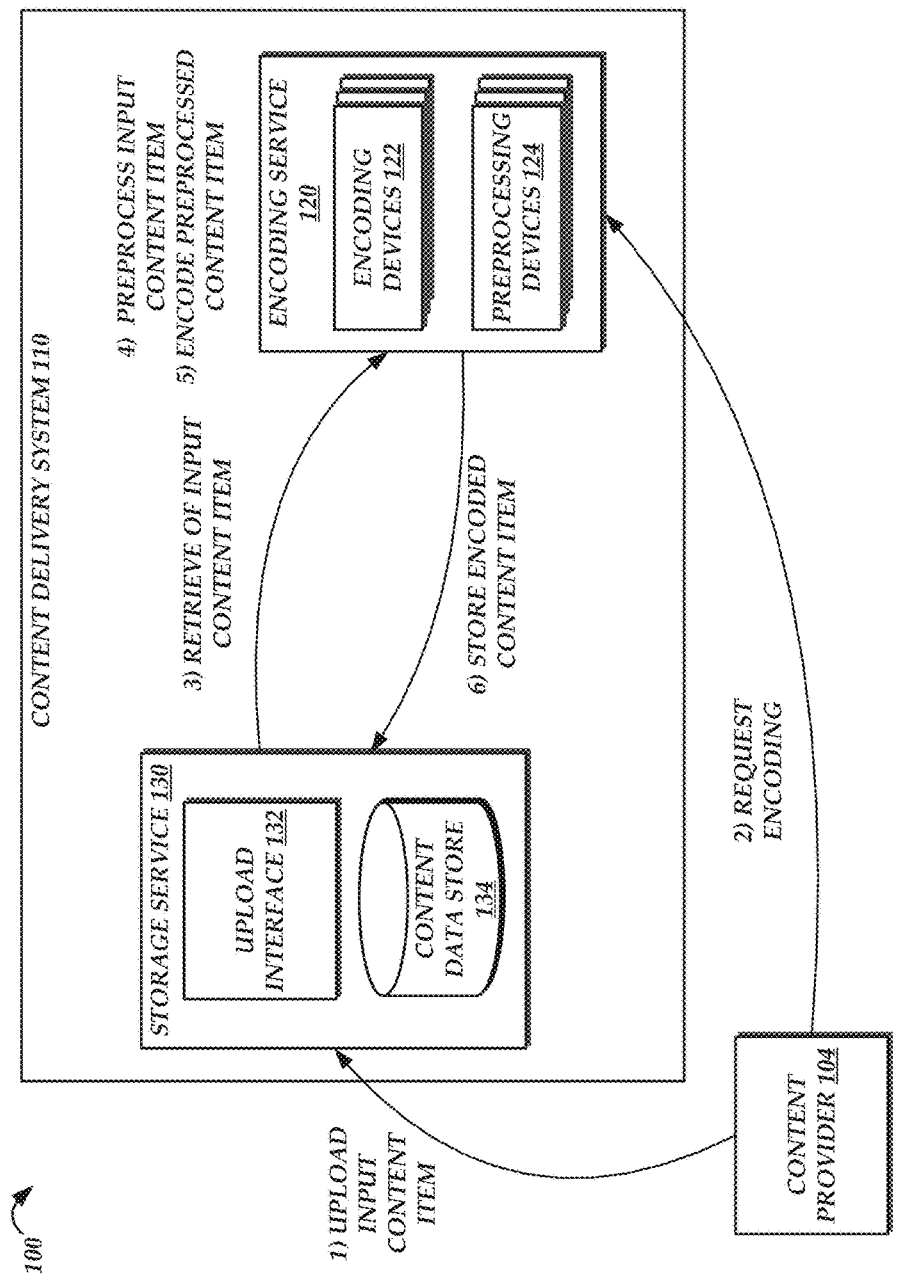
FIG. 4 is a block diagram depicting illustrative interactions of the content delivery system of FIG. 1 for encoding a input content item to facilitate transmission over a network, including preprocessing the input content item to reduce or eliminate unnecessary information.

With reference to FIG. 4, a set of illustrative interactions will be described for utilizing preprocessing based on JND thresholds to prepare a content item for distribution by the content delivery system 110. The interactions begin at (1), where a content provider 104 uploads an input content item to the storage service 130. The input content item may represent, for example, an unencoded or lightly encoded version of content, such as a "master" or "mezzanine" file. Because this version may not be suitable for broad distribution via a network (e.g., due to excessive size), the content provider 104 may, at (2), request that the encoding service 120 encode the input content item into a content item suitable for distribution via the content delivery system 110. In some contexts, encoding from a first encoded format to a second encoded content may be referred to as "transcoding." The present disclosure uses the term "encode" to encompass such transcoding, as well as to encompass encoding of "raw" or uncompressed content into encoded form.

At (3), the encoding service 120 begins to retrieve the input content item from the storage service 130 (e.g., from a location identified within the request for encoding). The encoding service 120 may then utilize one or more preprocessing devices 124 to conduct preprocessing on the input content item, at (4). An illustrative routine for conducting such preprocessing will be described below. However, in brief, a preprocessing device 124 may divide each image within the input content item into a number of image blocks of a given size (e.g., 8 by 8 pixels). The preprocessing device 124 may then generate a DCT matrix based on each component value of the pixels within the image block. The preprocessing device 124 may apply a set of JND thresholds to the DCT matrix to reduce the complexity of the matrix, and invert the DCT matrix to result in a reduced-complexity component value matrix. The reduced-complexity component values for each image block can then be recombined into a reduced-complexity image.

Thereafter, at (4), the encoding service 120, utilizing one or more encoding devices 122, can begin to encode the reduced-complexity content item to result in an encoded content item. For example, the encoded content item may be a JPEG formatted image, or MPEG-4 formatted video file. At (6), the encoded content item is stored to the storage service 130, from which it can be transmitted to client computing devices 102 (e.g., via the POPs 112). Due to the JND-based preprocessing conducted on the input content item, the encoded content item can be expected to be significantly reduced in size relative to an item generated by directly encoding the input content item. Thus, the JND-based preprocessing can significantly reduce the computing resources needed at the content delivery system 110 to store and transmit encoded content items.

Figure 5:
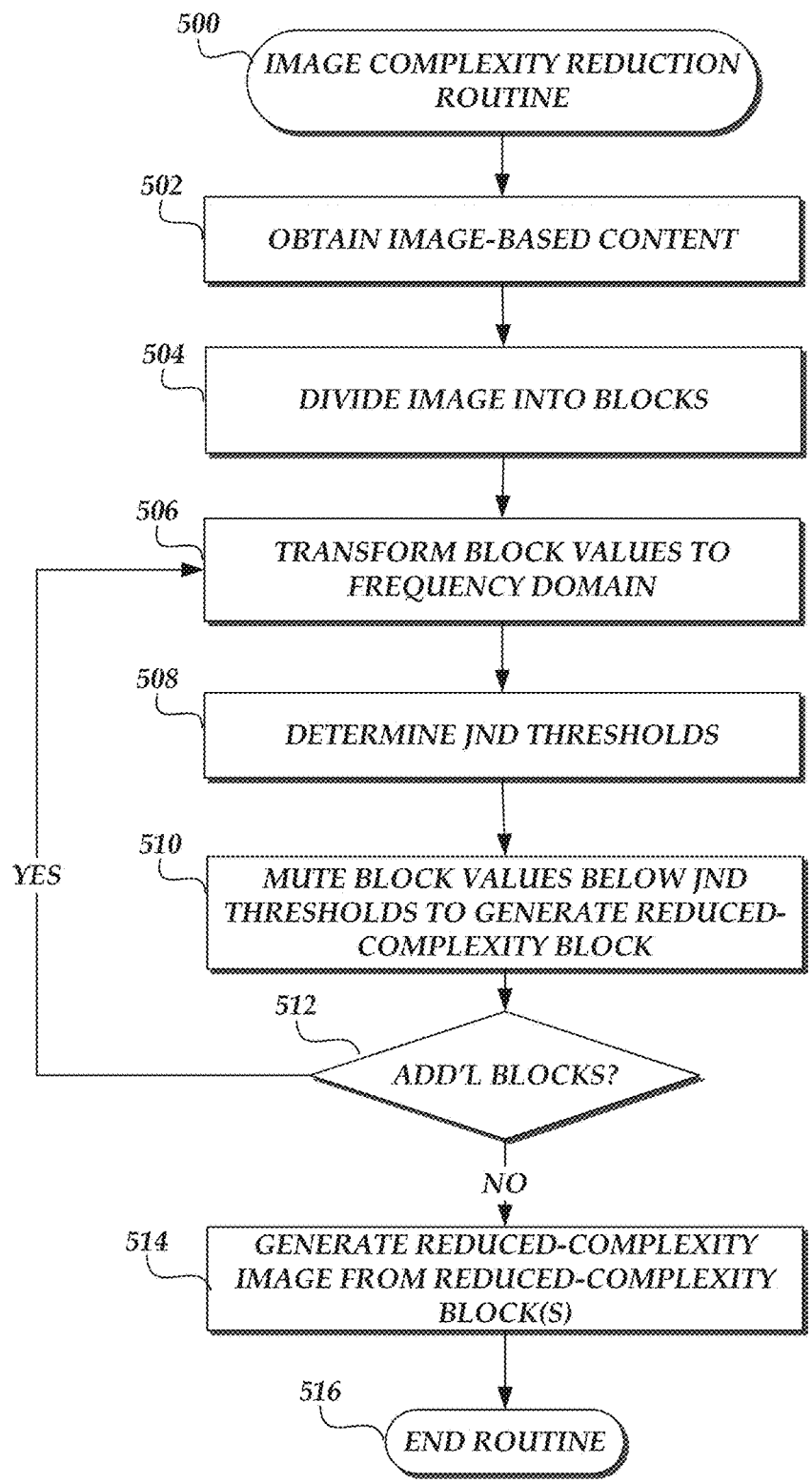
FIG. 5 is a flow chart depicting an illustrative routine for preprocessing an input content item to reduce or eliminate unnecessary information within the content item.

With reference to FIG. 5, one illustrative routine 500 for generating reduced-complexity content items based on JND thresholds will be described. The routine 500 may be carried out, for example, by the encoding service 120 utilizing one or more preprocessing devices 124. The routine 600 begins at block 502, where the content delivery system 110 obtains an image-based content, such as an image, video, or multimedia content item. The image-based content may be provided, for example, by a content provider 104.

At block 504, the encoding service 120 divides the image into image blocks, each representing a block of pixels of the image. In one embodiment, the blocks are of a predefined height and width, such as 8 by 8 pixels. In one embodiment, the blocks are independent and non-overlapping. In another embodiment, the blocks are overlapping (e.g., by a predefined number of pixels in each direction). To facilitate division of an image into image blocks, the image may in some instances be padded via edge replication techniques, a number of which are known in the art. For example, each edge of the image may be padded by a number of pixels equal to an overlap between image blocks.

At block 506, the encoding service 120 processes a first block of the image blocks, by transforming values of the block into the frequency domain by application of a DCT algorithm to result in a DCT matrix for the block. A number of DCT algorithms are known in the art. In one embodiment, the encoding service 120 utilizes the DCT-II algorithm. In one embodiment, the DCT algorithm is applied to a specific component of a color space used to represent the image. For example, the DCT algorithm may be applied to the Y' (luminance) component of a Y'CbCr color space.

At block 508, JND thresholds for the image block are determined. In one embodiment, equation (1), above, is used to determine the JND thresholds. For example, the JND thresholds may be determined based on modifying an initial set of thresholds (e.g., precomputed CSF thresholds empirically derived to represent thresholds under which a given percentage of a population is unlikely to perceive information, such as those shown in TABLE 1) based on a relative brightness of an image block relative to the image as a whole (e.g., according to equation (2)), on a variance of information within the image (e.g., according to equation (3)), or a combination thereof.

At block 510, values within the DCT matrix that fall below a corresponding JND threshold value are muted (set to zero), as the information represented by these values is unlikely to be perceptible to viewing users. As a result, a reduced-complexity image block is generated, which requires lower amounts of computing resources to store within the content delivery system 110 or to transmit via the network 106 but that is likely to be imperceptibly different from the original image block to a viewing user.

At block 512, the routine 500 varies according to whether image blocks of the image remain to be processed. If so, the routine 500 returns to block 506, where blocks 506 through 510 are repeated to generate additional reduced-complexity blocks.

At block 514, a reduced-complexity image is generated from the reduced-complexity blocks. In one embodiment, the reduced-complexity image may be generated by inverting the DCT transform of each reduced-complexity block to return the blocks to the spatial dimension, and then combining the blocks to construct a reduced-complexity image. Where the blocks overlap, such combination may include taking an average of multiple values for a given pixel represented by more than one block. In some instances, the average may be weighted to give additional weight to values that have not been modified from their original value within the image than to values that have been modified via complexity reduction. In another embodiment, the reduced complexity image may be generated by encoding the reduced-complexity blocks within the frequency domain, potentially without returning the image blocks to the spatial domain.

While the routine 500 is described sequentially, implementation of various blocks of the routine 500 may occur at least in part concurrently, and may be achieved by different components within the content delivery system 110. For example, the content delivery system 110 may use multiple preprocessing devices 124 to generate reduced complexity image blocks from different blocks of an image concurrently. In other instances, an individual preprocessing device 124 may generate reduced complexity image blocks from different blocks of an image concurrently. In still other instances, reduced complexity image blocks representing different components of a color space may be generated in sequence or concurrently. For example, a preprocessing device 124 may generate complexity image blocks with respect to both luminance and chrominance components of a color space used to represent the image. Thus, the sequence depicted in FIG. 5 is intended to be illustrative in nature.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for reducing complexity of image-based content comprising:
 a storage system comprising a set of just-noticeable-difference (JND) threshold values, the JND threshold values arranged into a matrix and corresponding to discrete cosine transform (DCT) subband values below which information is not expected to be perceivable to a percentage of viewing users; and
 a processing system comprising one or computing devices configured to:
  receive an image-based content item comprising at least one image;
  divide the image into a set of image blocks;
  for an individual image block within the set of image blocks:
   generate a DCT matrix for the image block at least partly by applying a DCT algorithm to values of individual pixels of the image block with respect to a component of a color-space by which the image block is represented;
   generate modified JND thresholds for the image block at least partly by modifying the JND threshold values based on a relative brightness of the image block to the at least one image as a whole and on a variance of the information within the image block; and
   generate a reduced-complexity DCT matrix at least partly by reducing to zero any value of the DCT matrix that falls below a corresponding threshold value of the modified JND thresholds; and generate a reduced-complexity image based at least in part on the reduced-complexity DCT matrix.

2. The system of claim 1, wherein the set of JND threshold values is based on an empirically-derived contrast sensitivity function (CSF).

3. The system of claim 1, wherein the processing system is further configured to generate an additional reduced-complexity DCT matrix for each additional image block within the set of image blocks.

4. The system of claim 1 further comprising an encoding device, wherein the encoding device is configured to encode at least the reduced-complexity image into an encoded version of the content item.

5. The system of claim 1, wherein the processing system is configured to generate the reduced-complexity image based at least partly on applying an inversion of the DCT algorithm to the reduced-complexity DCT matrix.

6. The system of claim 1, wherein the component represents luminance.

7. A computer-implemented method comprising:
obtaining a set of just-noticeable-difference (JND) threshold values, the JND threshold values arranged into a matrix and corresponding to discrete cosine transform (DCT) subband values below which information is not expected to be perceivable to a percentage of viewing users;
receiving an image-based content item comprising at least one image;
for a portion of the image:
generating a DCT matrix for the portion of the image at least partly by applying a DCT algorithm to values of individual pixels of the portion of the image with respect to a component of a color-space by which the portion of the image is represented;
generating modified JND thresholds for the portion of the image at least partly by modifying the JND threshold values based on a relative brightness of the portion of the image to the at least one image as a whole; and
generating a reduced-complexity DCT matrix at least partly by reducing to zero any value of the DCT matrix that falls below a corresponding threshold value of the modified JND thresholds; and
generating a reduced-complexity image based at least in part on the reduced-complexity DCT matrix.

8. The computer-implemented method of claim 7, wherein generating a reduced-complexity image based at least in part on the reduced-complexity DCT matrix comprising encoding the reduced-complexity DCT matrix into an encoded version of the content item.

9. The computer-implemented method of claim 7, wherein the component represents luminance, and wherein the method further comprises, for the portion of the image:
generating a second DCT matrix for portion of the image at least partly by applying the DCT algorithm to values of individual pixels of the portion of the image with respect to a second component of the color-space by which the portion of the image is represented; and
generating a second reduced-complexity DCT matrix at least partly by reducing to zero any value of the second DCT matrix that falls below a corresponding threshold value of the JND thresholds.

10. The computer-implemented method of claim 7, wherein the second component represents at least a portion of a chrominance of the portion of the image.

11. The computer-implemented method of claim 7, wherein the set of JND threshold values is a first set of JND threshold values, the method further comprising:
obtaining one or more additional sets of just-noticeable-difference (JND) threshold values, the one or more additional sets of JND threshold values corresponding to DCT subband values below which information is not expected to be perceivable to one or more additional percentages of viewing users; and
selecting the first set of JND threshold values based on a user input.

12. The computer-implemented method of claim 7 further comprising determining the relative brightness of the portion of the image to the at least one image as a whole by comparing an average value of a luminance component of the portion of the image to an average value of the luminance component across the image as a whole.

13. The computer-implemented method of claim 7 further generating an additional reduced-complexity DCT matrix for each additional portion of the image, wherein the reduced-complexity image is further generated based at least partly on the additional reduced-complexity DCT matrices for each additional portion of the image.

14. The computer-implemented method of claim 7, wherein the modified JND thresholds for the portion of the image are further generated by at least modifying the JND threshold values based on a variance of the information within the image block.

15. Non-transitory computer-readable media comprising instructions executable by a computing system to:
obtain a set of just-noticeable-difference (JND) threshold values, the JND threshold values arranged into a matrix and corresponding to discrete cosine transform (DCT) subband values below which information is not expected to be perceivable to a percentage of viewing users;
receive an image-based content item comprising at least one image;
for a portion of the image:
generate a DCT matrix for portion of the image at least partly by applying a DCT algorithm to values of individual pixels of the portion of the image with respect to a component of a color-space by which the portion of the image is represented;
generate modified JND thresholds for the portion of the image at least partly by modifying the JND threshold values based on a variance of the information within the image block; and
generate a reduced-complexity DCT matrix at least partly by reducing to zero any value of the DCT matrix that falls below a corresponding threshold value of the modified JND thresholds; and
generate a reduced-complexity image based at least in part on the reduced-complexity DCT matrix.

16. The non-transitory computer-readable media of claim 15, wherein the instructions further cause the computing system to:
generate an encoded version of the content item from at least the reduced-complexity image; and
distribute the encoded version to at least one client computing device over a network.

17. The non-transitory computer-readable media of claim 15, wherein the instructions are further executable by a system to generate the modified JND thresholds for the portion of the image at least partly by modifying the JND threshold values based on a combination of the variance of the information within the image block and a relative brightness of the portion of the image to the at least one image as a whole.

18. The non-transitory computer-readable media of claim 15, wherein the variance of the information within the image block is determined based at least partly on a sum of absolute values within relatively high frequencies of the DCT matrix.

19. The non-transitory computer-readable media of claim 15, wherein the instructions are further executable by a system to generate an additional reduced-complexity DCT matrix for each additional portion of the image, wherein the reduced-complexity image is further generated based at least partly on the additional reduced-complexity DCT matrices for each additional portion of the image.

20. The non-transitory computer-readable media of claim 15, wherein the portion of the image is a matrix of pixels within the image of a predefined height and width.

* * * * *